(12) United States Patent
Hüppi-Ziegler et al.

(10) Patent No.: US 11,641,095 B2
(45) Date of Patent: May 2, 2023

(54) HOLDER FOR CABLE CONDUITS

(71) Applicant: ABB Schweiz AG, Baden (CH)

(72) Inventors: Roger Hüppi-Ziegler, Mauren (LI); Martin Gueller, Gutenswil (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/478,416

(22) Filed: Sep. 17, 2021

(65) Prior Publication Data

US 2022/0094148 A1    Mar. 24, 2022

(30) Foreign Application Priority Data

Sep. 18, 2020  (EP) ..................................... 20196993
Nov. 25, 2020  (EP) ..................................... 20209708

(51) Int. Cl.
*F16L 3/00*      (2006.01)
*H02G 3/04*      (2006.01)
*F16L 3/22*      (2006.01)
*F16L 3/223*     (2006.01)

(52) U.S. Cl.
CPC ............ *H02G 3/0406* (2013.01); *F16L 3/222* (2013.01); *F16L 3/2235* (2013.01)

(58) Field of Classification Search
None
See application file for complete search history.

(56) References Cited

U.S. PATENT DOCUMENTS

| | | | |
|---|---|---|---|
| 2,355,742 A | 9/1942 | Morehouse | |
| 5,941,483 A * | 8/1999 | Baginski | F16L 3/237 248/68.1 |
| 7,770,848 B2 * | 8/2010 | Johnson | F16L 3/1207 248/65 |
| 8,267,357 B2 * | 9/2012 | Kataoka | B61D 49/00 248/68.1 |
| 10,060,557 B2 * | 8/2018 | Cox | F16L 5/14 |

(Continued)

FOREIGN PATENT DOCUMENTS

| | | |
|---|---|---|
| DE | 19816225 B4 | 1/2007 |
| EP | 0132192 A1 | 7/1984 |

(Continued)

OTHER PUBLICATIONS

ABB, Inc., "Application Recommendations: PMA Accessories and Conduits in Automation Applications," product brochure, 2 pp. (Mar. 2020).

(Continued)

*Primary Examiner* — Steven M Marsh

(74) *Attorney, Agent, or Firm* — Leydig, Voit & Mayer, Ltd.

(57) ABSTRACT

A holder for cable conduits including a first holder half connected to a second holder half, wherein the holder halves form at least one opening for holding a cable conduit, wherein the holder halves are aligned to each other by two aligning protrusions of the first holder half arranged inside two aligning recesses of the second holder half and two aligning protrusions of the second holder half arranged inside two aligning recesses of the first holder half. The aligning protrusions of each holder half are arranged symmetric to a central axis of the holder orthogonal to a connection plane between the holder halves.

16 Claims, 5 Drawing Sheets

(56) References Cited

U.S. PATENT DOCUMENTS

| | | | |
|---|---|---|---|
| 10,975,988 B2* | 4/2021 | Pieske | F16L 55/035 |
| 2003/0183413 A1 | 10/2003 | Kato | |
| 2010/0308183 A1 | 12/2010 | Hennon | |
| 2013/0214100 A1 | 8/2013 | Edmond et al. | |
| 2017/0184223 A1* | 6/2017 | Dean | F16L 3/1211 |
| 2019/0145551 A1* | 5/2019 | Schwalbe | F16L 3/1091 |
| | | | 248/67.5 |
| 2019/0379188 A1 | 12/2019 | Brouwer et al. | |
| 2022/0118585 A1* | 4/2022 | de Lint | B25B 5/147 |

FOREIGN PATENT DOCUMENTS

| | | |
|---|---|---|
| EP | 1886055 B1 | 7/2010 |
| EP | 3205917 B1 | 8/2018 |
| EP | 2535992 B1 | 9/2018 |
| EP | 3524422 A1 | 8/2019 |
| GB | 2312563 A | 10/1997 |
| JP | 2007-259591 A | 10/2007 |

OTHER PUBLICATIONS

ABB, Inc., "Automation Products: PMA Cable Protection System for Automation Applications," product brochure, 24 pp. (Sep. 2019).

ABB, Inc., "PMAFLEX—PUE—Corrugated Conduit: Highly Flexible, Soft-grade," product brochure, 2 pp. (undated).

\* cited by examiner

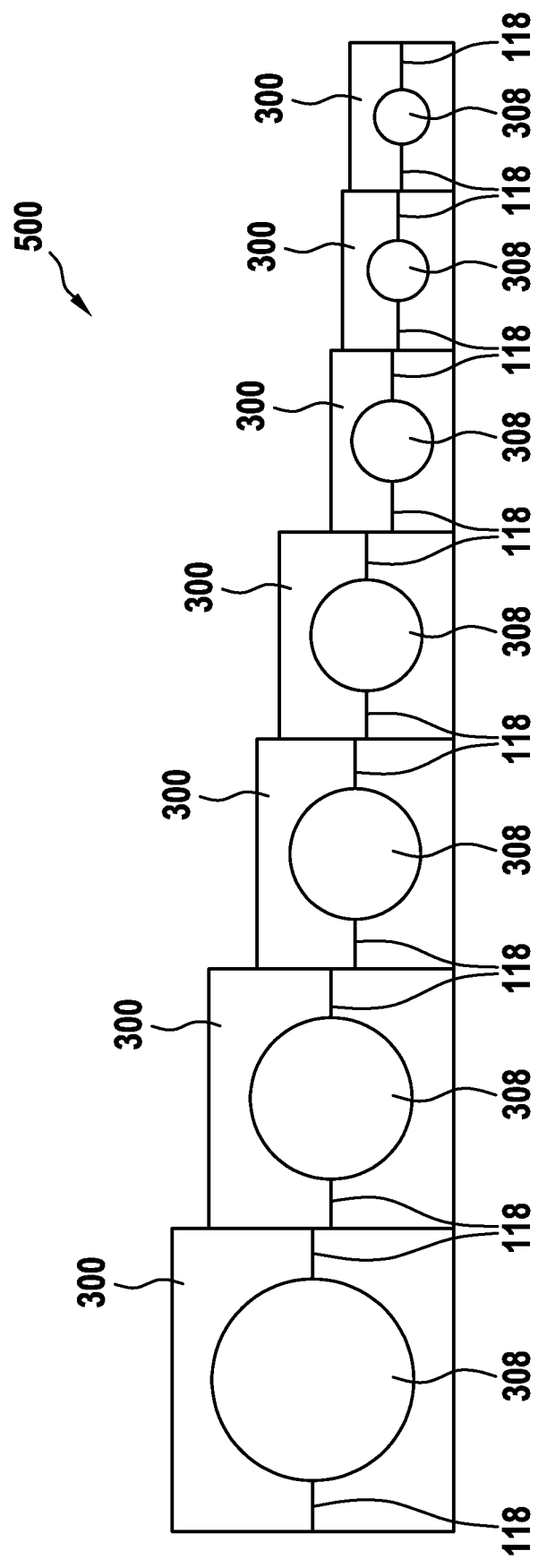

HOLDER FOR CABLE CONDUITS

CROSS-REFERENCE TO RELATED APPLICATIONS

This patent application claims the benefit of European Patent Application No. 20196993.8, filed Sep. 18, 2020, and European Patent Application No. 20209708.5, filed Nov. 25, 2020, which are fully incorporated herein by reference.

Priority is claimed to European Patent Application No. 20209708.5, filed on Nov. 25, 2020, and European Patent Application No. 20196993.8, filed on Sep. 18, 2020, the entire disclosures of which are hereby incorporated by reference herein.

FIELD OF THE INVENTION

The invention relates to a holder for cable conduits.

BACKGROUND OF THE INVENTION

A cable conduit may be mounted by using regularly spaced holders arranged along the cable conduit. The holder may have a lower part and an upper part. The lower part may be mounted to a surface or structure before the cable conduit is arranged in the holder. The upper part may be fixed to the lower part after the cable conduit is arranged in the holder.

For example, EP 1 886 055 B1 describes a holder for hoses or pipes.

DESCRIPTION OF THE INVENTION

It is an objective of the invention to provide an economic and reliable holder for cable conduits, which is easily and fail safe mountable.

This objective is achieved by the subject-matter of the independent claims. Further exemplary embodiments are evident from the dependent claims and the following description.

The invention relates to a holder for cable conduits, wherein the holder comprises a first holder half connected to a possibly identical second holder half, wherein the holder halves form at least one opening for holding a cable conduit, which may run orthogonal to the holder, wherein the holder halves are aligned to each other by two aligning protrusions of the first holder half arranged inside two aligning recesses of the second holder half and two aligning protrusions of the second holder half arranged inside two aligning recesses of the first holder half, wherein the aligning protrusions of each holder half are arranged symmetric to a central axis of the holder, wherein the central axis is arranged orthogonal to a connection plane between the holder halves.

Furthermore, the interfaces of the holder halves for interconnecting the holder halves may be equally designed. The interface of a holder have may comprise the aligning protrusions and the aligning recesses and/or may be the part of the holder halve, which faces the other holder halve. It may be that the holder halves are identically designed. This may reduce failures due to wrongly taken holder halves and/or may speed up mounting of the holder.

The first holder half may be mounted upon a wall or other structure first. The cable conduit may be inserted in the open opening and the second holder half may be set upon the first holder half in any orientation, as long as the opening encloses the cable conduit. The opening may be referred to as a hole through the holder. Each alignment protrusion of one holder half will then automatically slide into an alignment recess of the other holder half and will ensure a final alignment of both holder halves. After the joining of the holder halves, the holder may be securely mounted upon the wall or structure.

For example, the holder may be used in an electric and/or hybrid vehicle, such as an electric car, an electric train, an electric tram, an electric bus, etc. for holding cable conduits. A cable conduit may be a pipe, a corrugated pipe, a hose or a corrugated hose. A body of the holder may be made out of a plastic material. The body may be formed by injection molding. The body may be formed by filling a cavity of a mold with the plastic material in a liquified form. The plastic material may be a polyamide material, for example. A flame retardant may be added to the plastic material.

The holder half may comprise at least one receptacle for the cable conduit. The receptacle may have a half-circular groove orthogonal to a main plane of the holder half. The groove may extend from a first main surface of the holder half to an opposing second main surface of the holder half. A centerline of the groove may be arranged in the connection plane of the holder half.

A receptacle may be a void in the body. The receptacle may have a diameter essentially equal to an outer diameter of a cable conduit to be arranged in the receptacle. Cable conduits may have different sizes. Accordingly, the invention refers to different sized holder halves with different sized receptacles. In conjunction with another receptacle arranged in another holder half, the receptacles may form the enclosed opening in the holder. The opening may enclose the cable conduit circumferentially. The main plane of the holder half may be arranged orthogonally to a direction of the cable conduit in the holder. The connection plane may divide the opening into equal halves. The connection plane may be a midplane of a holder consisting of the two joined holder halves. Main surfaces of the holder half may be oriented transverse to the connection plane. The main surfaces may have a slight angular offset to the connection plane due to a draft of the mold. The draft may be between $0.2°$ and $5°$.

The holder half may comprise a connection surface to connect the holder half to the other holder half. The connection surface may be divided into at least a first alignment section and a second alignment section. The first alignment section may be arranged between the at least one receptacle and a first side surface of the holder half. The second alignment section may be arranged between the at least one receptacle and an opposing second side surface of the holder half.

The connection surface may make contact with the other holder half. The connection surface may be essentially aligned with the connection plane. The connection surface may be interrupted by the at least one receptacle. Sections of the connection surface adjoining the at least one receptacle on the outside of the at least one receptacle may be referred to as aligning sections of the connection surface. The aligning sections may be configured to align the holder half to the other holder half.

Each alignment section may comprise one of the alignment protrusions protruding over the connection plane. Each alignment section may have one of the alignment recesses receding from the connection plane. A mounting hole of the holder half may be arranged between the alignment protrusion and the alignment recess. A centerline of the mounting hole may be arranged in the main plane and orthogonal to the connection plane. The mounting hole may extend from the connection surface to an opposing mounting surface of the holder half.

An alignment protrusion may be referred to as an alignment dome. An alignment recess may be referred to as an alignment receptacle for an alignment dome of the other holder half. The alignment protrusion may provide at least one locating surface transverse to the connection plane. The alignment recess of the other holder half may provide at least a matching locating surface. When the locating surfaces of an alignment protrusion and an alignment recess touch, movement transverse to the locating surfaces is prevented. When more than one alignment protrusion of one holder half is in contact with its respective alignment recesses of the other holder half, shifting movements between the holder halves and/or rotational movements between the holder halves may be prevented. The alignment protrusion of one alignment section may be prismatic and may be oriented to one of the main surfaces of the holder half. The alignment recess of that alignment section may also be prismatic and may be oriented to the other main surface of the holder half. The alignment recess of that alignment section may provide at least one locating surface oriented essentially opposite to the locating surface of the alignment protrusion of that alignment section. A mounting hole may run completely through the body. The mounting hole may be referred to as mounting bore. The mounting hole may be essentially cylinder shaped. The mounting hole may be slightly conical due to the draft of the mold. The mounting holes of different sized holder halves may have a common size. The mounting holes may be sized as through-holes for M6 screws, for example. A through-hole may be slightly bigger than the intended screw. The alignment sections of different sized holder halves may also have a common size. A mounting surface may be essentially parallel to the connection plane. The mounting surface may be flat.

The alignment protrusions of both alignment sections are arranged symmetric to the central axis of the holder half. The alignment recesses of both alignment sections are also arranged symmetric to the central axis. The central axis is arranged in the main plane, orthogonal to the connection plane and central between the first side surface and the second side surface.

A central axis may be referred to as axis of symmetry. The central axis may be situated in the middle of the connection surface. The first alignment protrusion of the first alignment section may be arranged diagonally across the connection surface to the second alignment protrusion of the second alignment section. The first alignment recess of the first alignment section may be arranged diagonally across the connection surface to the second alignment recess of the second alignment section. By having the axial symmetry, the holder halves may be aligned to each other in any orientation to form the complete holder.

According to an embodiment of the invention, each holder half has two mounting holes arranged symmetric to the central axis. Each mounting hole ends in a flat-bottomed recess in a mounting surface of the holder half. Each recess is open to the adjacent side surface of the holder half.

A flat-bottomed recess may be referred to as a counterbore. The flat-bottomed recess may be big enough to fit a head of an open-end wrench onto a hexagonal nut or a hexagonal screw head arranged in the flat-bottomed recess. In particular the flat-bottomed recess may be big enough for a ten-millimeter open-end wrench. The flat-bottomed recess may have a U-shape open to the side surface. The flat-bottomed recess may be deep enough to fit a washer and the nut or a washer and the screw head. The flat-bottomed recess may be deep enough to fit a washer and a hex-key screw head. By having an oversized counterbore, different kinds of screw-type fasteners can be employed, as necessary. The rest of the mounting surface may be essentially planar.

According to an embodiment of the invention, the holder comprises at least two openings for a cable conduit each.

An intermediate section of the connection surface may be arranged between two adjacent grooves of the receptacles. The intermediate section of the connection surface may be essentially arranged in the connection plane. The intermediate section may have alignment purposes and provide locating surfaces essentially orthogonal to the connection plane. The intermediate section may alternatively be non-effective for alignment and just provide contact area aligned essentially parallel to the connection plane. The intermediate section may be less wide than the alignment sections. The intermediate section may keep the cable conduits at a distance. The intermediate section may be arranged at a narrowest point of the body between two receptacles. From the intermediate section the body may widen towards the mounting surface. Two holder halves with the same number of receptacles may be joined to form a holder with that number of openings. The receptacles may be equal sized. A holder half with two receptacles may have one intermediate section. A holder half with any number (n) of receptacles may have one less than the number (n−1) of intermediate sections.

According to an embodiment of the invention, a joining hole is arranged between two adjacent openings. The joining hole extends from the mounting surface to a flat-bottomed space open to the adjacent openings.

A joining hole may be a through-hole for a screw. The joining hole may be the same size as the mounting holes. The joining hole may be essentially cylinder shaped. The joining hole may be slightly conical due to the draft of the mold. A flat-bottomed space may also be referred to as a counterbore. The flat-bottomed space may be big enough to fit a head of a socket wrench onto a hexagonal nut or a hexagonal screw head arranged in the flat-bottomed space. In particular the flat-bottomed space may be big enough for a ten-millimeter socket wrench. The flat-bottomed space may be big enough to fit a screw head with a corresponding washer. The joining hole may be shorter than the mounting holes. The flat-bottomed space may be arranged in a widening part of the body between the receptacles. The flat-bottomed space may be close to the mounting surface.

According to an embodiment of the invention, the opening is formed by two half circular shaped receptacles arranged in each holder half. The receptacles each comprise at least one support clamp and at least one cavity for a corresponding support clamp of the other holder half. The support clamp extends the half circular shape of the receptacle over the connection plane.

A support clamp may be a finger of the body extending from an intermediate section or an alignment section. A distance from a tip of the support clamp to an opposing edge between the receptacle and the connection surface may be smaller than a diameter of the receptacle. The support clamp may work like a flat spring. The support clamp may be elastically deformed while a cable conduit is pressed into the receptacle. When the cable conduit is arranged in its designated place, the support clamp may at least partially rebound. The support clamp may be configured to keep the cable conduit in its designated place while the second holder half is placed on the first holder half.

According to an embodiment of the invention, the receptacles comprise two support clamps and two cavities each.

The support clamps are arranged axially symmetric to the central axis. The cavities are arranged axially symmetric to the central axis.

The support clamps may be arranged on opposite sides of the receptacle. The support clamps may be arranged on opposite sides of the main plane. The support clamps may be arranged diagonally across the receptacle. Accordingly, the cavities may be arranged diagonally across the receptacle the opposite way. With two support clamps the cable conduit is held in its designated place very firmly.

According to an embodiment of the invention, the alignment protrusions and alignment recesses are tapered.

The alignment protrusions may narrow towards their ends. The alignment recesses may narrow towards their ends. An angle of locating surfaces on the alignment protrusion may match an angle of a locating surface of the alignment recess. When the second holder half is placed on top of the first holder half with the cable conduit arranged in the receptacle, the narrowed ends of the four alignment protrusions enter into the wide openings of the alignment recesses. If the second holder half is slightly misaligned to the first holder half, the locating surfaces glide along each other and align the second holder half to the first holder half.

According to an embodiment of the invention, the alignment protrusions each have a catch and the alignment recesses each have a corresponding notch.

A catch may be an elastic element configured to rebound into a notch. The catch may be deformed before the corresponding alignment protrusion reaches a final position inside its designated alignment recess. When the final position is reached, the catch may rebound. When the catches have rebounded into the four notches, the second holder half is snapped to the first holder half. The catches may be facing the main surfaces.

According to an embodiment of the invention, the holder halves each comprise a ribbed support structure facing the other holder half.

The support structure may connect the main surfaces, the side surfaces and the mounting surface to the alignment sections and the receptacle. A ribbed support structure may have a plurality of interconnected ribs. The ribs may be slightly tapered due to the draft of the mold. The ribbed support structure may be arranged to conform to expected loading directions of the body. The ribs of the support structure may be interconnected by a orthogonal plate forming the mounting surface.

According to an embodiment of the invention the opening comprises a ridge to hinder an axial movement of a corrugated cable conduit arranged in the opening. The ridge is arranged in a main plane of the holder. The ridge extends into the opening.

A ridge may be sized to match a distance between two corrugations of the corrugated cable conduit. The ridge may span at least a section of a circumference of the groove. The ridge may be tapered. Ends of the ridge may be chamfered. The ridge may reduce a usable diameter of the receptacle for non-corrugated cable conduits.

According to an embodiment of the invention, the holder comprises a reduction shell to conform to a sub-sized cable conduit. The reduction shell is arranged in the opening. The ridge of the opening is arranged in a groove arranged on an outer diameter of the reduction shell. The reduction shell comprises two identical, bow-shaped parts. The outer diameter of the reduction shell is equivalent to the diameter of the receptacle. An inner diameter of the reduction shell is smaller than the diameter of the receptacle. The inner diameter has a ridge arranged in the main plane.

Cable conduits may have multiple, standardized diameters. A sub-sized cable conduit may have a smaller diameter than the opening. A on part of the reduction shell may be arranged in the receptacle of a holder half before the sub-sized cable conduit. The reduction shell may bridge a gap between the holder and the sub-sized cable conduit. Accordingly, the reduction shell may have an inner diameter equivalent to an outer diameter of the sub-sized cable conduit. The reduction shell may be shaped essentially like a cylinder having a wall thickness of the gap. The reduction shell may have least one detent on its outer diameter. The first part of the reduction shell may be snapped into the first receptacle of the first holder half and the correspondent second part of the reduction shell may be snapped in second receptacle of the second holder half before the holder halves are joined. By using reduction shells, it is possible to fix cable conduits of various diameters in a holder half with two or more receptacles having uniform diameters.

According to an embodiment of the invention the holder comprises an inner reduction shell to conform to a sub-sized cable conduit. The inner reduction shell is nested in the reduction shell. The ridge of the reduction shell is arranged in a groove arranged on an outer diameter of the inner reduction shell. The reduction shell comprises two identical, bow-shaped parts. The outer diameter of the inner reduction shell equivalent to the inner diameter of the reduction shell. An inner diameter of the inner reduction shell is smaller than the inner diameter of the reduction shell. The inner diameter has a ridge arranged in the main plane.

An inner reduction shell may be a normal reduction shell for an opening with a smaller diameter. The inner reduction shell may bridge a gap between the reduction shell and the sub-sized cable conduit. The inner reduction shell may be shaped essentially like a cylinder having a wall thickness of the gap. The inner reduction shell may have least one detent on its outer diameter. The inner reduction shell may be snapped into the reduction shell before the holder halves are joined. Multiple reduction shells with decreasing diameters may be stacked.

According to an embodiment of the invention the holder comprises a clamping insert to conform to an unstructured cable conduit. The clamping insert is arranged in the opening or nested in the reduction shell. The ridge of the receptacle or the ridge of the reduction shell is arranged in a groove arranged on an outer diameter of the clamping insert. The outer diameter of the clamping insert is equivalent to the diameter of the receptacle or the inner diameter of the reduction shell. An inner diameter of the clamping insert is smaller than the inner diameter of the receptacle or the reduction shell. The inner diameter is ridge free.

Cable conduits may have a smooth surface. A cable without a cable conduit may have a smooth surface. A clamping insert may compensate at least a height of the ridge to enlarge a clamping surface and prevent damage to the smooth surface. The clamping insert may be made of a soft plastic material. The clamping insert may be made of a polyethylene material. A flame retardant may be added to the plastic material. When the smooth cable conduit or a naked cable is clamped between two clamping inserts arranged in opposing receptacles or reduction shells, the clamping insert may be compressed. The clamping insert may have a thick middle section and tapered side sections. Particularly the thick middle section may be compressed while clamping the cable conduit or cable.

In an embodiment of the invention two or more holders are stacked above each other.

An upper holder may be connected to a lower holder via long screws through the mounting holes of both holders. The mounting surface of the second holder half of the lower holder may be arranged flush against the mounting surface of the first holder half of the upper holder. Holder halves with more than one receptacle may be preconnected via short screws arranged in the joining holes.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

FIG. 5 shows a schematic depiction of a family of holders according to an embodiment.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
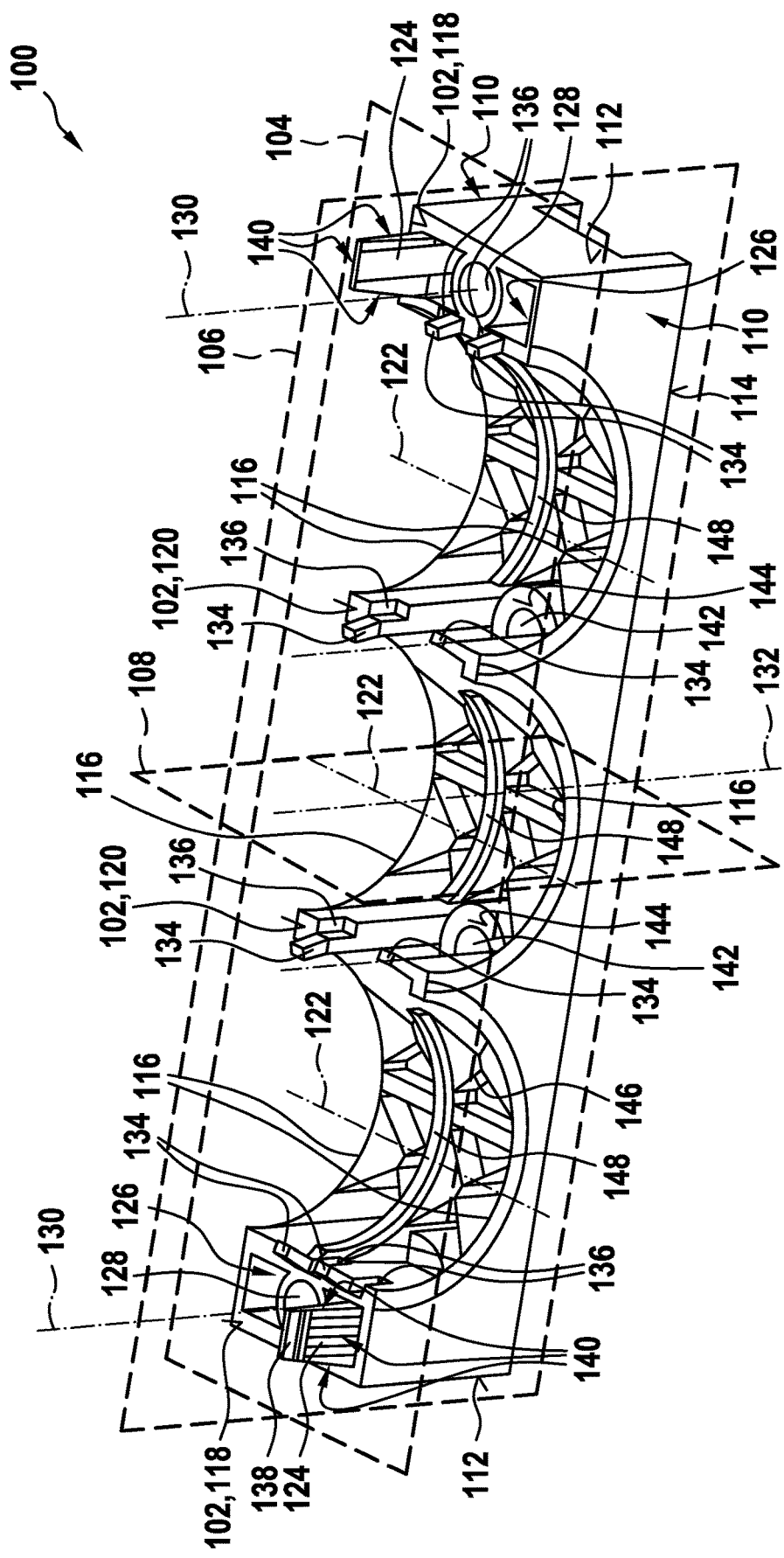
FIG. 1 shows a spatial view of a holder half according to an embodiment.

FIG. 1 shows a spatial view of a holder half 100 according to an embodiment. The holder half 100 is a first half or a second half of a holder configured to hold three regularly spaced cable conduits to a surface or structure. The holder half 100 is an essentially rectangular shaped body. The holder half 100 has a connection surface 102 to connect the holder half 100 to the other holder half to form the complete holder. The connection surface 102 is essentially arranged in a connection plane 104 of the holder. The connection plane 104 is arranged orthogonal to a main plane 106 and a side plane 108 of the holder half 100. Two main surfaces 110 of the holder half 100 are arranged symmetric to the main plane 106. Two side surfaces 112 of the holder half 100 are arranged symmetric to the side plane 110. A mounting surface 114 of the holder half 100 is arranged parallel to the connection plane 104 opposite the connection surface 102.

The holder half 100 has three regularly spaced receptacles 116 for a cable conduit each. The receptacles 116 are essentially semi-circular cut-outs in the connection surface 102. The remaining body resembles an imaginary inverted bridge with three arches. Between the outer cut-outs and the side surfaces 112 remain two abutments of the imaginary inverted bridge. Between the cut-outs themselves remain two piers of the imaginary inverted bridge. A span of the imaginary inverted bridge runs along the mounting surface 114. The abutments and piers widen towards the mounting surface 114 by a radius of the cut-outs and are interconnected with each other by the span of the imaginary inverted bridge.

The receptacles 104 are arranged centrally in the connection surface 102. The receptacles 116 divide the connection surface 102 in two alignment sections 118 and two intermediate sections 120. The alignment sections 118 and the intermediate sections 120 are arranged at the narrowest point of the remaining body. The receptacles 116 are arranged orthogonal the main plane 106. The receptacles 116 are equally sized. The cut-outs extend from one main surface 110 to the other main surface 110. Centerlines 122 of the cut-outs are arranged in the connection plane 104. The alignment sections 118 are arranged between the receptacles 116 and the side surfaces 112. The intermediate sections 120 are arranged between the receptacles 116.

Each alignment section 118 has an alignment protrusion 124 and an alignment recess 126. The alignment protrusion 124 protrudes over the connection plane 104. The alignment recess 126 recedes from the connection plane 104. A mounting hole 128 orthogonal to the connection plane 104 is arranged central between them. The mounting hole 128 runs from the connection surface 102 to the mounting surface 114. A centerline 130 of the mounting hole 128 is arranged in the main plane 106. The alignment protrusion 124 is arranged in a corner of the alignment section 118 formed by the side surface 112 and one of the main surfaces 110. The alignment recess 126 is arranged in an opposite corner of the alignment section 118 formed by the side surface 112 and the other main surface 110. A margin of the connection surface 102, arranged in the connection plane 104, runs around the alignment protrusion 124 and the alignment recess 126. The margin extends between the mounting hole 128 and the side surface 112.

The alignment protrusions 124 in both alignment sections 118 are arranged in diagonally opposing corners of the connection surface 102. The alignment recesses 126 in both alignment sections 118 are also arranged in the remaining diagonally opposing corners of the connection surface 102. The alignment protrusions 124 and the alignment recesses respectively are arranged axial symmetric to a central axis 132 of the holder half 100. The central axis 132 is arranged in an intersecting line between the main plane 106 and the side plane 108.

In an embodiment the receptacles 116 comprise support clamps 134. The support clamps 134 are arranged symmetric to the central axis 132. Each support clamp 134 protrudes over the connection plane 104. Each support clamp 134 extends the circular contour of its respective receptacle 116 over the connection plane 104. Due to the increased angle of grip resulting from the support clamp 134, a resulting opening width of the receptacle 116 is smaller than a diameter of the semi-circular cut-out. The support clamps are arranged in the alignment sections 118 and the intermediate sections 120 next to the cut-outs.

Since the support clamps 134 protrude over the connection plane, the receptacles 116 also comprise cavities 136 to receive the support clamps 134 of the other holder half. The cavities 136 are also arranged symmetric to the central axis 132. The support clamps 134 and the cavities 136 of one receptacle 116 are arranged symmetric to the main plane 106. The cavities are also arranged in the alignment sections 118 and the intermediate sections 120 next to the cut-outs.

In an embodiment each receptacle 116 has two support clamps 134. The support clamps 134 of one receptacle 116 are arranged on opposing sides of the receptacle 116.

In an embodiment the alignment protrusions 124 are shaped like halves of elongated pyramids. Ridges of the pyramids are arranged parallel to the main surfaces 110.

In an embodiment the alignment protrusions 124 comprise a catch 138 running along the ridge. The catch 138 is configured to snap in behind an undercut in the corresponding alignment recess 126. The catch 138 is deformed when the two holder halves 100 are joined. In the deformed state the catch 138 slides over an edge of the undercut. When the holder halves 100 reach their final position, the catch 138 rebounds behind the edge into the undercut. This way a mechanical restraint is reached between the joined holder halves 100.

In an embodiment the alignment protrusions 124 comprise three locating surfaces 140 each. The alignment recesses each comprise three matching locating surfaces 140. The locating surfaces 140 of one aligning protrusion 124 are arranged towards the nearer side surface 12, the nearer main surface 110 and the adjacent receptacle 116. In other words, the locating surfaces 140 are facing outwards from the locating protrusion, wherein two of the locating surfaces 140 are arranged opposite to each other. The locating surface 140 facing the main surface 110 is ribbed.

In an embodiment the holder half 100 has two joining holes 142. Each joining hole 142 is arranged between two of the receptacles 116. Each joining hole 142 runs from the mounting surface 114 to a flat-bottomed space 144 arranged in the widening part of the body between the receptacles 116. The flat-bottomed space 144 is arranged parallel to the mounting surface 114. The flat-bottomed space 144 is essentially circular. The flat-bottomed space 144 resembles a counterbore from the connection surface 102. The joining holes 142 are designated for screws to mount the holder half 100 to something. The flat-bottomed spaces 144 are designated for screwheads of the screws with washers. The flat-bottomed spaces 144 are wide enough to fit different kinds of screwhead and the associated tool. Particularly the flat-bottomed spaces 144 are wide enough for hexagonal screwheads and the fitting socket wrench.

In an embodiment the holder half 100 has a ribbed support structure 146. The ribbed support structure 146 has interconnected ribs connecting the main surfaces 110 to the mounting surface 114, the side surfaces 112 and the connection surface 102. The ribbed support structure 146 reduces an amount of material used to make the holder half 100. The ribbed support structure 146 faces towards the connection surface 102. The ribs of the ribbed support structure 146 are arranged in expected directions of load. The ribbed support structure 146 stiffens the surfaces of the holder half 100.

In an embodiment the receptacles 116 each have a ridge 148 arranged in the main plane 106. The ridges 148 extend into the cut-outs and reduce a free diameter of the receptacles 116. The ridges 148 are configured to fit into a corrugation structure of corrugated cable conduits. The ridges 148 run along at least part of the diameter of each receptacle 116.

Figure 2:
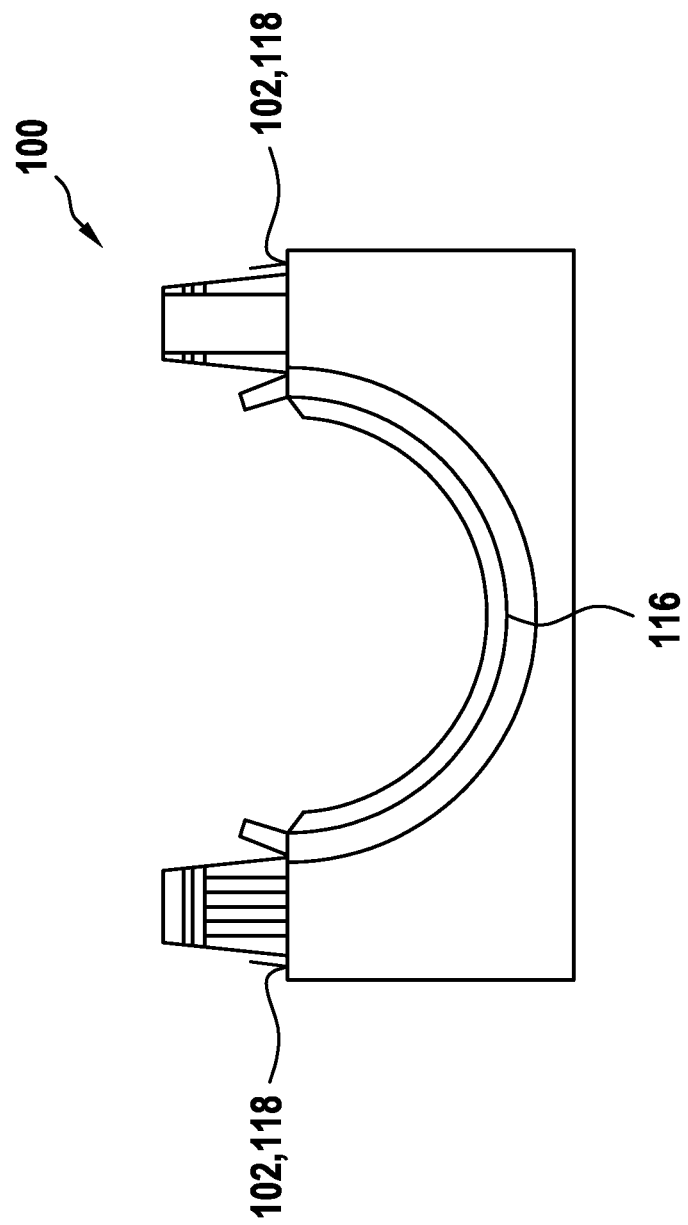
FIG. 2 shows a front view of a single-receptacle holder half according to an embodiment.

FIG. 2 shows a front view of a single-receptacle holder half 100 according to an embodiment. The holder half 100 has one receptacle 116. The connection surface 102 consists of the two alignment sections 118. As in FIG. 1 the receptacle 118 is a semi-circular cut-out on the body of the holder half 100. Since there is only one receptacle 116, there are no intermediate sections. The alignment sections 118 resemble the alignment sections shown in FIG. 1.

Figure 3:
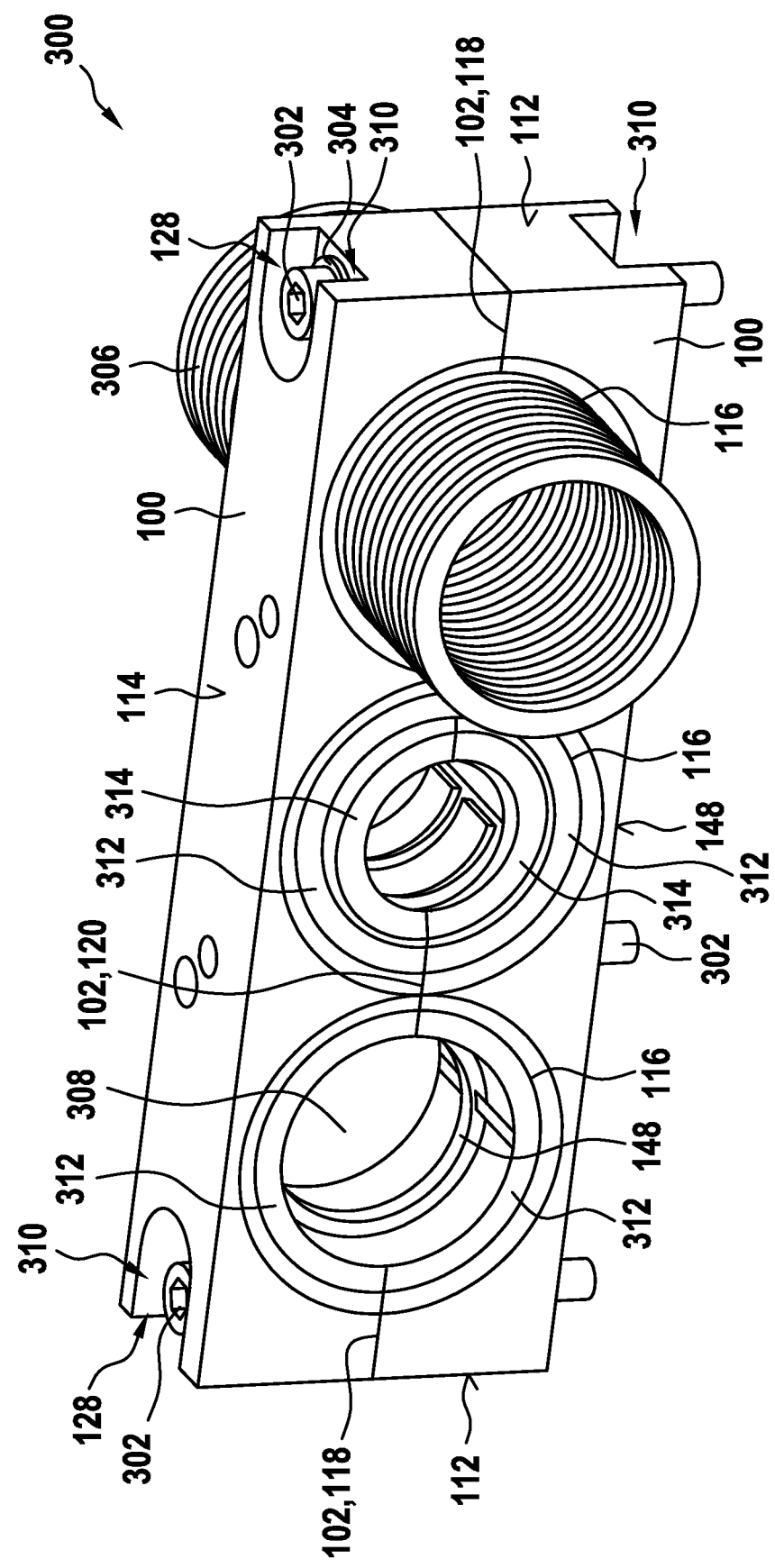
FIG. 3 shows a spatial view of a holder according to an embodiment.

FIG. 3 shows a spatial view of a holder 300 according to an embodiment. The holder 300 can be referred to as a 3-fold NW36 holder. The holder 300 consists of two holder halves 100 of FIG. 1 aligned to each other by their alignment sections 118 and connected at their connection surfaces 102. One holder half 100 can be referred to as first holder half 100. The other holder half 100 can be referred to as second holder half 100. The mounting surface 114 of the first holder half 100 is set against a surface or structure and screws 302 are arranged in the joining holes 142. The screws 302 may be screwed into tapped holes in the surface or the structure. The screws 302 may also be screwed in tapped nuts behind the surface or structure. Washers 304 may be arranged between the flat-bottomed spaces 144 and screwheads of the screws.

After mounting the first holder half 100 one cable conduit 306 per receptacle 116 may be arranged in the receptacles 116 of the first holder half 100. Here one cable conduit 306 is snapped into one of the receptacles 116. The cable conduit 306 is a corrugated pipe or a corrugated hose. While the cable conduit 306 is pressed into the receptacle 116, the support clamps are temporarily deformed to allow the cable conduit 306 to pass. After the widest part of the cable conduit 306 has passed the support clamps the support clamps rebound essentially into their original form. The support clamps preliminary fix the cable conduit 306 in the receptacle 116.

After arranging the cable conduit 306 in the receptacle 116 the second holder half 100 is aligned to the first holder half by inserting the alignment protrusions of the second holder half 100 in the alignment recesses of the first holder half 100 and inserting the alignment protrusions of the first holder half 100 in the alignment recesses of the second holder half 100. The catches of the alignment protrusions snap into the notches of the alignment recesses when the second holder half 100 is aligned to the first holder half. Thereby the second holder half 100 is preliminary fastened to the first holder half 100. In the aligned position the receptacles 116 of the first holder half 100 and the receptacles 116 of the second holder half 100 form a circular opening 308 to enclose the cable conduit 306 circumferentially. Long screws 302 are arranged in the mounting holes 128 of the second holder half 100. The screws 302 extend through the mounting holes of the first holder half 100 into the surface or structure the first holder half 100 is mounted to. The screws 302 may be screwed into tapped holes in the surface or the structure. The screws 302 may also be screwed in tapped nuts behind the surface or structure. Washers 304 may be arranged between the flat-bottomed spaces 144 and screwheads of the screws.

In an embodiment the mounting holes 128 each end in a flat-bottomed recess 310 in the mounting surface 114. The flat-bottomed recess 310 is oversized and open to the adjacent side surface 112. The flat-bottomed recess 310 is basically a U-shaped pocket in the mounting surface 114. The flat-bottomed recess 310 is wide enough to manipulate a hexagonal screwhead or hexagonal nut arranged in the flat-bottomed recess 310 with an open-ended wrench. The flat-bottomed recess 310 is deep enough that a hex-key screwhead with washer is flush with or recedes below the surrounding mounting surface 114.

In an embodiment a reduction shell 312 each is arranged in opposing receptacles 116 of both holder halves 100 before the cable conduit 306 is arranged in the receptacle 116. The reduction shells 312 reduce a diameter of the opening 308 to an outer diameter of a sub-sized corrugated cable conduit. The reduction shells 312 are essentially cylinder halves with a groove on the outside and a ridge 148 on the inside. The groove on the outside admits the ridge of the receptacle 116. The ridge in the groove provides a form fit between the holder half 100 and the reduction shell 312. The ridge 148 on the inside is configured to fit in the corrugation structure of the sub-sized corrugated cable conduit. The reduction shell 312 is made of a rigid plastic material.

In an embodiment clamping inserts 314 are arranged in opposing receptacles 116 of both holder halves 100. The clamping inserts 314 are made of a flexible plastic material.

The clamping inserts 314 are bow-shaped and like the reduction shells 312 have a groove on the outside to admit the ridge of the receptacle 116. Unlike the reduction shells 312 the clamping inserts 314 have no diameter-reducing ridge on the inside. The clamping inserts 314 may be used for a smooth cable conduit or a cable without cable conduit. The clamping inserts 314 are slightly thickened in the middle to provide compressible material for the clamping.

Figure 4:
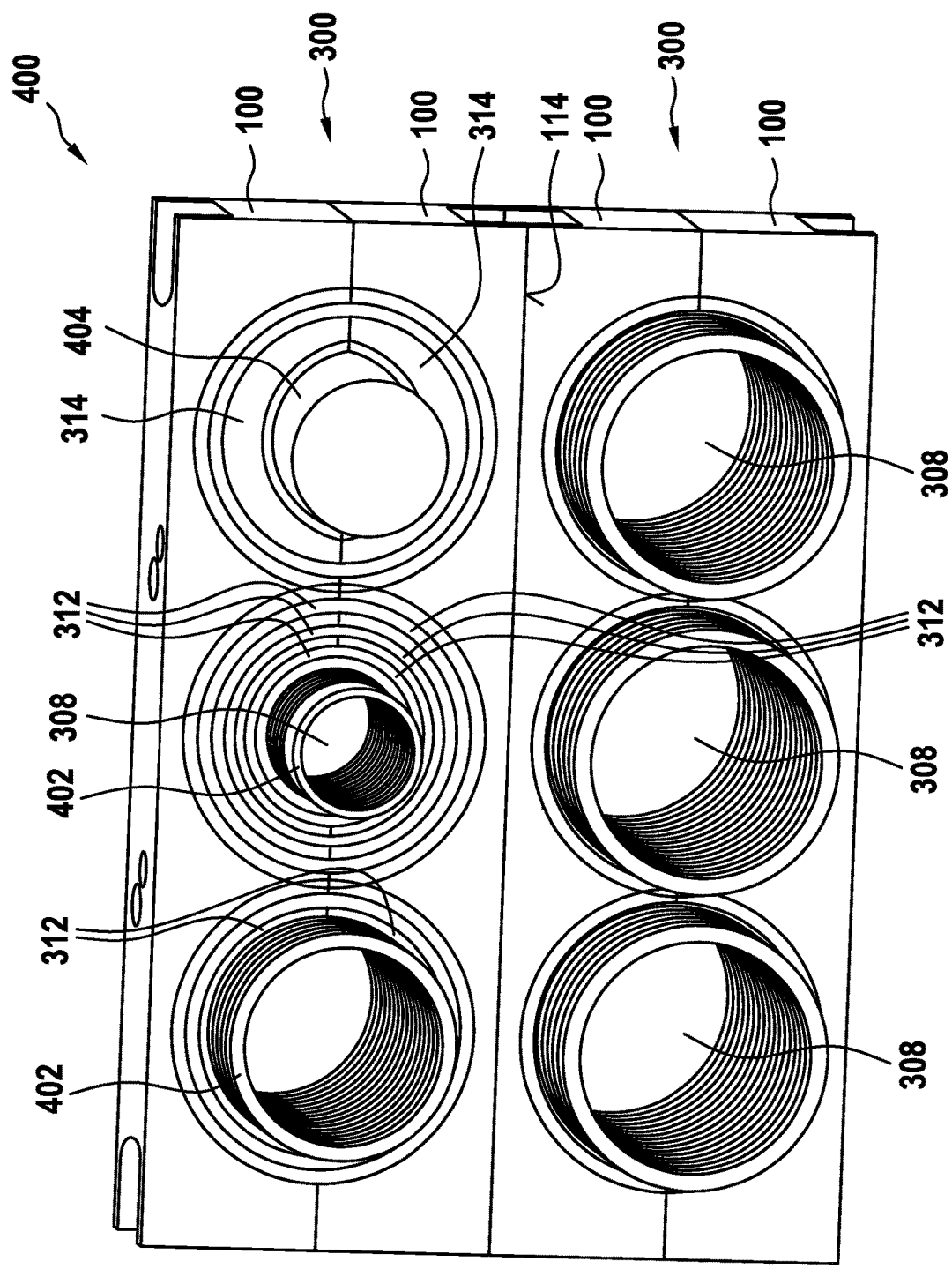
FIG. 4 shows a spatial view of a stack of holders according to an embodiment.

FIG. 4 shows a spatial view of a stack 400 of holders 300 according to an embodiment. The stack 400 consists of two holders 300 of FIG. 3 above each other. Each opening 308 is used. The first holder half 100 of a lower holder 300 is arranged on the surface or structure first. The second holder half 100 of the lower holder 300 is snapped onto the first holder half 100 of the lower holder 300 with the first holder half 100 of an upper holder 300 already in place. The first holder half 100 of the upper holder 300 is placed on the mounting surface 114 of the second holder half 100 of the lower holder 300 and is mounted to the second holder half 100 of the lower holder by screws in the joining holes. The second holder half 100 of the upper holder 300 may be joined with its counterpart first holder half 100 before or after the holder halves of the lower holder 300 are joined.

In an embodiment one opening 308 of the stack 400 has multiple reduction shells 312 of decreasing size nested inside each other to accommodate a sub-sized cable conduit 502 much smaller than the opening 308. Each smaller reduction shell 312 has an outer diameter equivalent to an inner diameter of the bigger reduction shell 312 it nests in.

In an embodiment clamping inserts 314 are nested inside a pair of reduction shells 312. The clamping inserts 314 have an outer diameter equivalent to an inner diameter of the bigger reduction shells 312 they nest in. A cable 404 is clamped in the clamping inserts 314.

In particular FIG. 4 shows the first 3-fold holder 300 NW36 of FIG. 3 and a second holder 300 NW36 stacked on top. One corrugated pipe 402 NW29 is fitted with reduction half-shells 312 in one of the NW36 openings 308 of the second holder 300. Another corrugated pipe 402 NW17 is fitted with reduction half-shells 312 in another NW36 opening of the second holder 300. A reduction insert 314 for cables with a diameter corresponding to NW17 is fitted in a third opening 308 of the second holder 300. The reduction can be made up to NW10. hoses or cables can be used instead of corrugated pipes. This results in many possible combinations of nominal sizes with corrugated pipes, tubes, cables and hoses with an optimized overall size and weight.

FIG. 5 shows a schematic depiction of a family 500 of holders 300 according to an embodiment. The family 500 consists of multiple holders 300 of various sizes. Each holder 300 has a different sized opening 308. To facilitate the depiction, only holders 300 with single openings 308 are depicted. The holders 300 may have different numbers of openings 308.

In each holder 300 of the family 500 the alignment sections 118 have the same size. Each holder 300 may be mounted by using screws with a uniform diameter but varying lengths. In particular the depicted holder family 500 is configured to be mounted with M6 metric screws, wherein screws with various screw drives may be used. The spaces allotted to accommodate the screwheads and washers are dimensioned to allow the required tool heads. In particular the spaces are sized to allow open end wrenches to be rotated at least 30°.

In other words, a universal holder for corrugated pipes, tubes, cables and hoses is introduced. The introduced universal holder for corrugated pipes, tubes, cables and hoses has a special focus on rapid assembly and weight saving. The introduced universal holder extends the application possibilities and ease of assembly of a holder for differently dimensioned corrugated pipes, tubes, cables and hoses with divided holding sections.

A conventional holder is identical in size and weight for each nominal diameter and thus the size and the mounting position are also equal. Identical upper and lower parts are turned by 180° around the vertical axis in order to carry out assembly. Thereby confusion can occur in the assembly position of the pre-assembled lower part. The conventional holder has slotted spigots to center the holder from the top and bottom The introduced universal holder makes the assembly steps easier and prevents confusion of the assembly positions of the upper and lower parts. the universal holder is size and weight-optimized and can be used for other nominal sizes/ cable/hose sizes by using special inserts. By pre-assembling one half of the holder, final assembly can be carried out with one hand, while the other hand is free for final assembly. The pre-assembled inserts do not fall out due to a constructive taper.

Both the holder halves and the inserts allow for pre-clamping of corrugated pipes, tubes, cables and hoses.

During assembly, socket head cap screws or hexagon head screws can be used due to additional recesses on both end of the holder.

The holder is weight-optimized, yet stable due to the ribbed structure design.

The holders and reduction inserts are made of non-reinforced PA6-FR. The cable and hose inserts are made of a flexible TPE-S with flame protection.

The holder can also be made of another polyamide, a reinforced plastic material, or other corresponding technical thermoplastic. The soft components can also be made of another soft and flame-retardant TPE or another group of materials.

Both materials, PA6-FR and TPE-S, meet the fire protection standard for the railway industry according to EN 45545.

The general construction is lightweight with high impact resistance and allows for a quick installation, which is possible with one hand. The holders of the family are compact and optimized per size. A line rotation is possible inside the openings to avoid line torsion. Pipes and or cables are axially fixed in the openings.

Pre-assembly happens in the lower support part. Due to the support clamps the pipes can be snapped in during pre-assembly.

The introduced holder has multi-purpose use. It can be used to support pipes and cables. Reduction half-shells can be snapped into the receptacles for flexible use. Cable clamping inserts can be snapped into the receptacles to clamp cables without cable conduits.

The introduced holder allows a user-friendly installation by being configured for standard M6 in all sizes. Socket head cap screws or hexagon head screws can be used. Retaining clamps support a quick installation. The clamp halves are pre-centered, and no specific mounting position is required.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A holder for cable conduits, comprising:
a first holder half connected to a second holder half, the holder halves forming at least two openings for holding a cable conduit,
wherein the holder halves are aligned to each other by two aligning protrusions of the first holder half arranged inside two aligning recesses of the second holder half and two aligning protrusions of the second holder half arranged inside two aligning recesses of the first holder half,
wherein the aligning protrusions of each holder half are arranged symmetric to a central axis of the holder,
wherein the central axis is arranged orthogonal to a connection plane between the holder halves,
wherein a joining hole is arranged between two adjacent openings, and
wherein the joining hole extends from a mounting surface of the first holder half to a flat-bottomed space open to the adjacent openings.

2. The holder of claim 1, wherein interfaces of the holder halves for interconnecting the holder halves are equally designed.

3. The holder of claim 1, wherein each holder half has two mounting holes arranged symmetric to the central axis,
wherein each mounting hole ends in a flat-bottomed recess in a mounting surface of the holder half, and
wherein each flat-bottomed recess is open to an adjacent side surface of the holder half.

4. The holder of claim 1, wherein the opening is formed by two half circular shaped receptacles arranged in each holder half, the receptacles each comprising at least one support clamp and at least one cavity for a corresponding support clamp of the other holder half, and
wherein the support clamp extends the half circular shape of the receptacle over the connection plane.

5. The holder of claim 4, wherein the receptacles comprise two support clamps and two cavities each, and
wherein the support clamps are arranged axially symmetric to the central axis and the cavities are arranged axially symmetric to the central axis.

6. The holder of claim 1, wherein the alignment protrusions and alignment recesses are tapered.

7. The holder of claim 1, wherein the alignment protrusions each have a catch and the alignment recesses each have a corresponding notch.

8. The holder of claim 1, wherein the holder halves each comprise a ribbed support structure facing the other holder half.

9. The holder of claim 1, wherein the opening comprises a ridge to hinder an axial movement of a corrugated cable conduit arranged in the opening, and
wherein the ridge is arranged in a main plane of the holder and extends into the opening.

10. The holder of claim 9, further comprising:
a reduction shell to conform to a sub-sized cable conduit,
wherein the reduction shell is arranged in the opening and the ridge is arranged in a groove arranged on an outer diameter of the reduction shell,
wherein the reduction shell comprises two identical, bow-shaped parts and the outer diameter of the reduction shell is equivalent to the diameter of the opening, and
wherein an inner diameter of the reduction shell is smaller than the diameter of the opening and has a ridge arranged in the main plane.

11. The holder of claim 10, further comprising:
an inner reduction shell to conform to a sub-sized cable conduit,
wherein the inner reduction shell is nested in the reduction shell and the ridge of the reduction shell is arranged in a groove arranged on an outer diameter of the inner reduction shell,
wherein the inner reduction shell comprises two identical, bow-shaped parts and the outer diameter of the inner reduction shell is equivalent to the inner diameter of the reduction shell, and
wherein an inner diameter of the inner reduction shell is smaller than the inner diameter of the reduction shell and has a ridge arranged in the main plane.

12. The holder of claim 9, further comprising:
a clamping insert to conform to an unstructured cable conduit or cable,
wherein the clamping insert is arranged in the opening or nested in the reduction shell and the ridge of the opening or the reduction shell is arranged in a groove arranged on an outer diameter of the clamping insert,
wherein the outer diameter of the clamping insert is equivalent to the diameter of the opening or the inner diameter of the reduction shell, and
wherein an inner diameter of the clamping insert is smaller than the inner diameter of the opening or the reduction shell and is ridge free.

13. A holder for cable conduits, comprising:
a first holder half connected to a second holder half, the holder halves forming at least one opening for holding a cable conduit,
wherein the holder halves are aligned to each other by two aligning protrusions of the first holder half arranged inside two aligning recesses of the second holder half and two aligning protrusions of the second holder half arranged inside two aligning recesses of the first holder half,
wherein the aligning protrusions of each holder half are arranged symmetric to a central axis of the holder,
wherein the central axis is arranged orthogonal to a connection plane between the holder halves,
wherein the opening is formed by two half circular shaped receptacles arranged in each holder half, the receptacles each comprising at least one support clamp and at least one cavity for a corresponding support clamp of the other holder half, and
wherein the support clamp extends the half circular shape of the receptacle over the connection plane.

14. The holder of claim 13, wherein the receptacles comprise two support clamps and two cavities each, and
wherein the support clamps are arranged axially symmetric to the central axis and the cavities are arranged axially symmetric to the central axis.

15. A holder for cable conduits, comprising:
a first holder half connected to a second holder half, the holder halves forming at least one opening for holding a cable conduit; and
a reduction shell to conform to a sub-sized cable conduit, wherein the holder halves are aligned to each other by two aligning protrusions of the first holder half arranged inside two aligning recesses of the second holder half and two aligning protrusions of the second holder half arranged inside two aligning recesses of the first holder half, wherein the aligning protrusions of each holder half are arranged symmetric to a central axis of the holder, wherein the central axis is arranged orthogonal to a connection plane between the holder halves, wherein the opening comprises a ridge to hinder an axial movement of a corrugated cable conduit arranged in the opening, wherein the ridge is arranged in a main plane of the holder and extends into the opening, wherein the opening comprises a ridge to hinder an axial movement of a corrugated cable conduit arranged in the opening, wherein the ridge is arranged in a main plane of the holder and extends into the opening, wherein the reduction shell is arranged in the opening and the ridge is arranged in a groove arranged on an outer diameter of the reduction shell, wherein the reduction shell comprises two identical, bow-shaped parts and the outer diameter of the reduction shell is equivalent to the diameter of the opening, and wherein an inner diameter of the reduction shell is smaller than the diameter of the opening and has a ridge arranged in the main plane.

16. The holder of claim 15, further comprising:

an inner reduction shell to conform to a sub-sized cable conduit, wherein the inner reduction shell is nested in the reduction shell and the ridge of the reduction shell is arranged in a groove arranged on an outer diameter of the inner reduction shell, wherein the inner reduction shell comprises two identical, bow-shaped parts and the outer diameter of the inner reduction shell is equivalent to the inner diameter of the reduction shell, and wherein an inner diameter of the inner reduction shell is smaller than the inner diameter of the reduction shell and has a ridge arranged in the main plane.

* * * * *